United States Patent [19]

Rath

[11] 4,365,695
[45] Dec. 28, 1982

[54] DISC BRAKE AND FRICTION PAD ASSEMBLY THEREFOR

[75] Inventor: Heinrich B. Rath, Vallendar, Fed. Rep. of Germany

[73] Assignee: Lucas Industries Limited, Birmingham, England

[21] Appl. No.: 162,639

[22] Filed: Jun. 24, 1980

[30] Foreign Application Priority Data

Jun. 26, 1979 [GB]  United Kingdom ............... 7922203

[51] Int. Cl.³ ............................................ F16D 65/02
[52] U.S. Cl. ................................ 188/73.39; 188/73.45
[58] Field of Search .................... 188/71.1, 72.4, 72.5, 188/73.3, 73.5, 73.6, 1 A, 250 B, 1.11, 73.44, 73.45, 73.32, 73.33, 73.39

[56] References Cited

U.S. PATENT DOCUMENTS

| | | | |
|---|---|---|---|
| 3,261,430 | 2/1966 | Wilson et al. | 188/73.6 |
| 3,406,792 | 10/1968 | Kennel | 188/72.4 |
| 3,616,878 | 11/1971 | Girauldon | 188/73.5 |
| 3,713,091 | 1/1973 | Kobayashi et al. | 188/1.11 X |
| 4,121,698 | 10/1978 | Baum | 188/73.3 |
| 4,141,436 | 2/1979 | Meyer | 188/73.45 X |
| 4,194,597 | 3/1980 | Evans et al. | 188/73.39 X |
| 4,241,327 | 12/1980 | Yamamoto | 188/1.11 X |

FOREIGN PATENT DOCUMENTS

| | | | |
|---|---|---|---|
| 1905350 | 8/1970 | Fed. Rep. of Germany | 188/1 A |
| 1254937 | 1/1961 | France | 188/250 G |

*Primary Examiner*—George E. A. Halvosa
*Attorney, Agent, or Firm*—Scrivener, Clarke, Scrivener and Johnson

[57] ABSTRACT

The present specification discloses a disc brake and a friction pad assembly therefor. In the brake at least one pin passes through an aperture in the backing plate of the inboard friction pad assembly to form a friction pad guide and support. A sheath of corrosion-resistant material also passes through said aperture and is preferably an interference fit therein. The sheath extends towards the plane in which the disc engaging face of the friction pad secured to the backing plate, lies, and always covers the end region of the extended portion of the pin, the sheath being contacted and abraded by the disc of the brake as the pad wears. The sheath thus protects the pin from corrosion ensuring smooth movement of the friction pad assembly.

10 Claims, 6 Drawing Figures

DISC BRAKE AND FRICTION PAD ASSEMBLY THEREFOR

DESCRIPTION

The present invention relates to a friction pad assembly for use in a spot-type disc brake, and a disc brake incorporating such a friction pad assembly.

In certain opposed-piston disc brakes the friction pad assemblies are supported and guided on short pins which engage through holes in the friction pad assemblies. The surface of these pins is however exposed to the weather and liable to corrosion which can affect the efficiency of the brake. This is clearly undesirable.

Pin sliding disc brakes can basically comprise either a caliper slidably mounted by virtue of a pin or pins secured to or sliding in a torque plate. In use, an actuator in the caliper acts directly upon a friction pad assembly i.e. normally the inboard friction pad assembly, to move this inboard friction pad assembly onto the disc, reaction forces causing relative movement between the caliper and the torque plate and thus applying the other friction pad assembly i.e. normally the outboard friction pad assembly, onto the disc. In most spot-type disc brakes the friction pad assemblies are guided for movement towards the disc in guides which are open to the atmosphere and hence liable to corrosion.

In many pin sliding disc brakes the inboard friction pad assembly is located on separate guides which are open to corrosion. The corrosion can affect the efficiency of the brake since the inboard friction pad assembly should move first to enable reaction forces to apply the outboard friction pad assembly. The pin or pins upon which the caliper or torque plate is located are known to be protected by boots so that it is then only the abovementioned separate guides for the inboard friction pad assembly, which are subject to corrosion.

It is an aim of the present invention to provide a friction pad assembly for use in a disc brake, together with such a disc brake, whereby the above affects of corrosion are obviated.

According to the present invention there is provided a friction pad assembly for use in a disc brake, comprising a backing plate to which a pad of friction material is secured, a sheath being located in an aperture in the backing plate and extending beyond the backing plate towards the plane in which the face of the pad remote from the backing plate lies.

Preferably the sheath is an inteference fit in the aperture in the backing plate and is made of a material which abrades in unison with the pad of friction material when applied to the disc of the brake. Alternatively the sheath may be made of a material which is softer than the pad of friction material and which thus abrades more easily than the friction material when applied to a disc of a brake. Also, the sheath may alternatively be a loose fit in the aperture in the backing plate.

In a pin sliding disc brake the pin or pins can extend to engage through the sheath in the aperture in the backing plate of the inboard friction pad assembly or separate pin abutments can be provided. The pin or pins thus additionally act as guides and support the inboard friction pad assembly, the sheath or sheaths protecting the extended portion of the pin or pins, thus preventing corrosion of the working surfaces. Similarly in certain opposed-piston disc brakes wherein the friction pad assemblies are supported on pins, the sheaths can protect the sliding surfaces of the pins.

According to a further feature of the present invention there is provided a spot-type disc brake comprising a caliper and torque plate, a friction pad assembly comprising a backing plate with a pad of friction material secured thereto, being slidably supported on at least one pin which extends through an aperture in the backing plate, the or each pin being protected by a sheath which also passes through the aperture and which extends towards the plane in which the face of the pad of friction material remote from the backing plate, lies.

According to a still further feature of the present invention there is provided a pin sliding disc brake comprising a caliper and a torque plate, at least one pin providing a sliding connection between the caliper and torque plate, an extended portion of the or each pin passing through an aperture in a backing plate of a friction pad assembly, a pad of friction material being secured to the backing plate, the or each extended pin portion being protected by a sheath which also passes through the aperture and which extends towards the plane in which the face of the pad of friction material remote from the backing plate, lies, and which always covers the end region of the extended pin portion.

Thus, in a disc brake constructed in accordance with the present invention, a friction pad assembly is supported on a pin or pins also used to provide the sliding connection between the caliper and the torque plate, a sheath of corrosion resistant material protecting the extended portion of the pin. The sheath may be movable in the aperture in the backing plate so that it may move axially relative to the aperture as the friction pad wears. However, preferably the sheath is secured in the aperture, e.g. it is an interference fit, and is made of a material which abrades in unison with the friction material as the pad wears during normal use. Alternatively the sheath may be of a softer material than the pad of friction material and may abrade easily as the pad wears. It will be appreciated that as the pad wears so the pin or pins will become exposed between the torque plate and the backing plate, and be liable to corrosion. This will not affect immediate performance but the pins will have to be cleaned to remove corrosion before new friction pad assemblies are installed. To overcome this liability to corrosion boots may be provided between the torque plate and backing plate to protect the pins as the pad wears.

The present invention will now be further described, by way of example, with reference to the accompanying drawings, in which.

Figure 1:
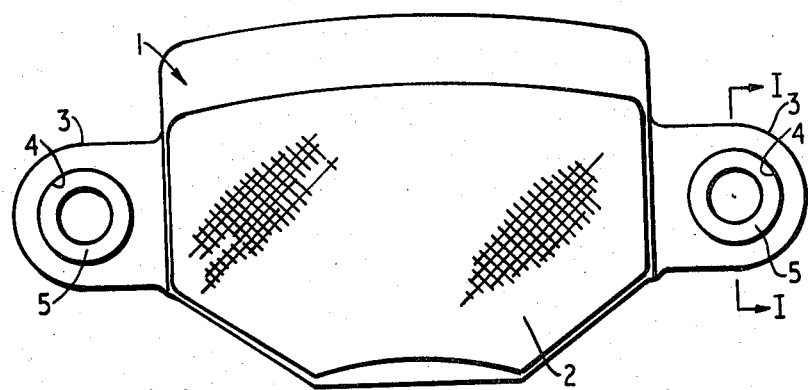
FIG. 1 is a front view of one embodiment of a friction pad assembly constructed according to the present invention.
Figure 2:
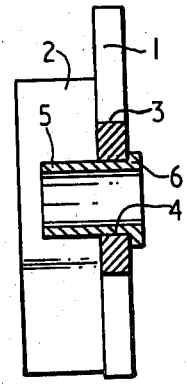
FIG. 2 is a cross-sectional view along line I—I in FIG. 1.

Considering FIGS. 1 and 2 of the accompanying drawings, here is shown a friction pad assembly comprising a backing plate 1, to which a pad 2 of friction material is secured. The backing plate 1 has two laterally extending ears 3, an aperture 4 being provided in each ear 3. As best seen in FIG. 2, a sheath 5 of a corrosion resistant material is an interference fit in each aperture 4, the sheath having a radially extending flange 6 which enables the sheath to be accurately located in the aperture 4. Alternatively sheath 5 can be a loose fit in aperture 4.

Figure 3:
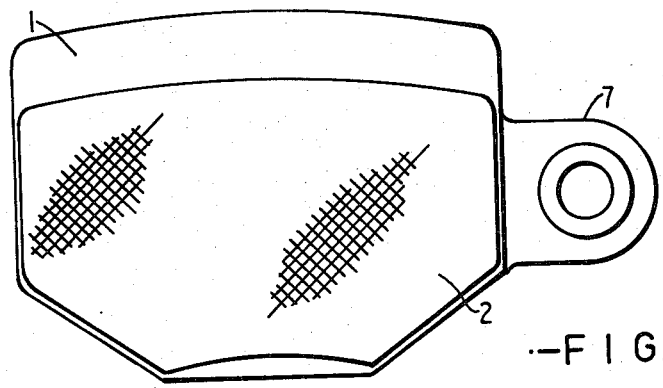
FIG. 3 is a front view of another embodiment of friction pad assembly constructed according to the present invention.

The friction pad assembly shown in FIG. 3 differs from that of FIGS. 1 and 2, only by virtue of the fact that it has only one laterally extending ear 7, this friction pad assembly being suitable for a single pin sliding caliper disc brake.

Figure 4:
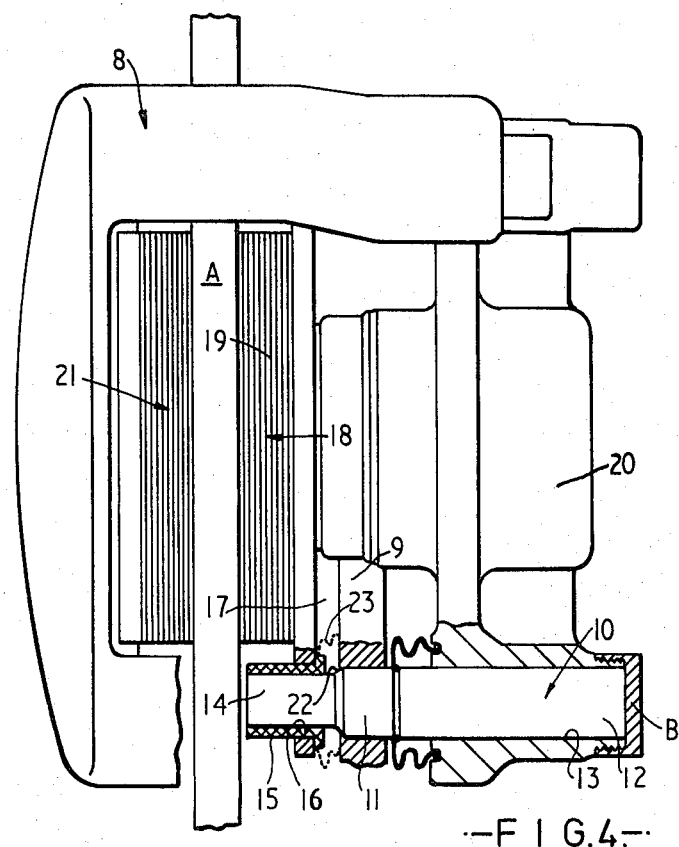
FIG. 4 is a plan view, partially in cross-section, of a twin pin sliding caliper disc brake according to the present invention.

FIG. 4 is a plan view, partially in cross-section, of a twin pin sliding caliper disc brake according to the present invention. The brake basically comprises a caliper generally designated 8, which is slidably mounted on a torque plate 9 by means of two pins 10 (only one of which is evident by virtue of the partial cross-section). The pins 10 are identically arranged and for the sake of clarity reference will now only be made to the illustrated pin 10. The pin 10 is secured to the torque plate at 11, one end region 12 of the pin 10 extending in a bore 13 in the caliper 8. The other end region 14 of pin 10 extends through a sheath 15 of corrosion resistant material which is an interference fit in an aperture 16 in the backing plate 17 of inboard friction pad assembly 18. Alternatively sheath 15 can be a loose fit and axially movable relative to aperture 16. Inboard friction pad assembly 18 is thus supported by pins 10 and basically comprises backing plate 17 to which a pad 19 of friction material is secured, and sheath 15 engaging in aperture 16.

When the brake is operated, hydraulic actuator 20 presses on backing plate 17 causing friction pad assembly 18 to slide on end regions 14 of pins 10 and to engage disc A. Reaction forces cause caliper 8 to slide on end regions 12 of pin 10, outboard friction pad assembly 21 also engaging disc A. As the friction pad assemblies 18,21 wear, so the sheath 15 moves with backing plate 17 towards disc A exposing end region 14 of pin 10 at 22. The sheath eventually engages disc A and is abraded thereby in unison with pad 19. The material of the sheath can be softer than that of the friction pad so that it abrades easily.

Whilst pin 10 is exposed at 22 and is liable to corrosion, this does not effect the brake performance as the working surfaces at any one time are not exposed. However the pins 10 shall require cleaning to remove corrosion before the installation of new friction pad assemblies. To obviate the necessity for this latter cleaning a boot 23 (shown in dashed lines) can be providing between the torque plate 9 and backing plate 17 to protect the exposed pin regions at 22.

To replace the friction pad assembly 18, cap B is removed to expose the end of pin 10. Then by rotating pin 10 using a suitable tool, the pin can be unscrewed from the torque plate 9 and drawn through bore 13, extended pin portions 14 releasing the friction pad assembly.

Figure 5:
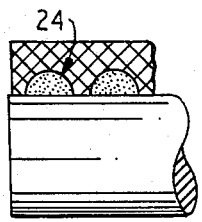
FIG. 5 is a detailed view of part of a modified sheath for use in the present invention.
Figure 6:
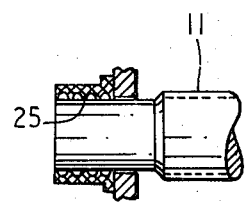
FIG. 6 is a cross-sectional view of an alternative form of sheath suitable for use in the present invention.

Whilst the sheath 15 is shown in FIGS. 2 and 4 as a mere sleeve of corrosion resistant material, alternative sheaths can be used to advantage. Two such alternatives are shown in FIGS. 5 and 6. The sheath of FIG. 5 has small annular grooves 24 in its inner wall, which allow for the retention of a lubricant. These grooves 24 can be in the form of a screw thread or helix which can be provided in a sleeve located in the sheath. The sheath of FIG. 6 incorporates an anti-friction bearing 25.

Thus in the present invention the inboard friction assembly is supported on the pins which are also used for the connection between caliper and torque plate, a sheath protecting the bearing surfaces of the pins and preventing corrosion occurring, which corrosion could effect brake performance.

I claim:

1. A spot-type disc brake comprising a caliper and torque plate, a friction pad assembly comprising a backing plate with a pad of friction material secured thereto being slidably supported on at least one pin having a portion which extends through an aperture in the backing plate, a sheath covering at least the extended portion of the pin to protect same, said sheath also passing through said aperture and extending towards the plane in which the face of the pad of friction material remote from the backing plate lies, said sheath lying within the periphery of the disc so as to be abraded by the disc as the pad wears away, and said sheath, during use, at all times covering all of the extended portion of the pin to protect all of the sliding surface thereof throughout the wear life of said friction material.

2. A pin sliding disc brake comprising a caliper and a torque plate, at least one pin providing a sliding connection between the caliper and torque plate, a friction pad assembly comprising a backing plate having at least one aperture therethrough and a pad of friction material secured to one face thereof, an extended portion of the or each pin passing through said aperture in said backing plate and extending beyond said one face the extended pin portion being protected by a sheath which also passes through the aperture and which extends towards the plane in which the face of the pad of friction material remote from the backing plate lies, and which always covers all of the extended portion of the pin to protect all of the sliding surface thereof throughout the wear life of said friction material, said sheath lying within the periphery of the disc so as to be abraded by the disc as the pad wears away.

3. A disc brake according to claim 1 or 2, wherein the sheath is an interference fit in the aperture in the backing plate and is made of a material which abrades in unison with the pad of friction material when applied to the disc of a brake.

4. A disc brake according to claim 1 or 2, wherein the sheath is an interference fit in the aperture in the backing plate and is made of a material which is softer than the pad of friction material and thus abrades easier than the pad of friction material when applied to the disc of a brake.

5. A disc brake according to claim 1 or 2, wherein the sheath is a loose fit in said aperture.

6. A disc brake according to claim 1 or 2, wherein the sheath has a radially outwardly extending flange which prevents the sheath from passing completely through said aperture.

7. A disc brake according to claim 1 or 2, wherein the sheath is made of a corrosion-resistant material.

8. A disc brake according to claim 1 or 2, wherein the sheath has small annular grooves on its inner wall, for the passage of a lubricant.

9. A disc brake according to claim 1 or 2, wherein the sheath incorporates an anti-friction bearing.

10. A disc brake according to claim 2, wherein a flexible protective boot protects the pin between the sheath and the torque plate to which the pins are attached.

* * * * *